Patented Dec. 27, 1938

2,141,843

UNITED STATES PATENT OFFICE 2,141,843

HYDROXYALKYLAMINO COMPOUNDS

Fritz Meyer, Grymes Hill, Staten Island, and Eva Schreiber, née Stege, Great Kills, Staten Island, N. Y.

No Drawing. Application November 20, 1937, Serial No. 175,564

18 Claims. (Cl. 167—65)

The present invention relates to hydroxyalkylamino compounds and methods for making same.

Sulfanilic acid amide, or, shortly, sulfanilamide, has proved as valuable means in combating diseases caused by streptococci, especially of the hemolytic type, as found for instance in septicemia, peritonitis, erisipelas, scarlet fever, mastoiditis, septic sore throat and meningitis.

A disadvantage of the said amide resides in its very low solubility in water or physiological salt solution so that, in order to reach the necessary dosage, several hundred cubic centimeters of an about .8% solution have to be administered. Besides this, its toxicity is not entirely satisfactory and some disagreeable by-effects are occasionally encountered.

Azo compounds and other known bodies containing the radical of the above amide are either colored or contain substituents which do not add to the therapeutic value.

We have now found that highly valuable compounds in which the above mentioned disadvantages are substantially reduced can be obtained by reacting amino sulfonamides, especially the aromatic sulfanilamide, with aldoses and particularly those having abnormal ether linkages. By aldoses having abnormal ether linkages we wish to define in the following and for the sake of brevity in the annexed claims those aldoses which are assumed to contain an ether linkage connecting other carbon atoms than a first and a fourth carbon atom of the chain, as for instance galactose, xylose, glucosan and levoglucosan, as well as soluble polyoses containing the same, such as lactose.

The reaction of the amide with the aldose chosen can be carried out in various ways, as for instance by heating the components to temperatures below their decomposition either in a practically dry state or in the presence of a substantial amount of a solvent for the reaction product, like water or, particularly, an organic water miscible inert liquid like the lower aliphatic alcohols or dioxan. Reaction may also be obtained by biological methods. As by-products are formed in a fusion or on working in water so that the recovery of the desired reaction products by drying, extraction, reduction of by-products and similar steps is rather tedious, working in the presence of said organic solvents appears as the simplest method and will, therefore, be more specifically described. As ethyl alcohol is an easily available and cheap solvent with a convenient boiling point this is generally preferred but methyl alcohol or mixtures of methyl with ethyl alcohol, or with higher alcohols, like propyl alcohol, or with dioxan, may be employed, the time of heating required depending on the temperature chosen which may vary by the choice of solvents or the pressure in the reaction vessel or both. The simplest method consists in refluxing the reaction mixture at atmospheric pressure until the reaction components are more or less completely dissolved whereupon heating is proceeded with for some time and from ½ to at most ⅔ of the solvent is distilled off. The heating and especially the distilling off of the solvent should not be carried further than until the solvent assumes a yellowish tinge, and remainders of solvent which are still to be removed when such coloration has occurred, for instance by local overheating, should be distilled off in vacuo, to avoid further discoloration and losses. It has generally proved best to reflux about equimolecular amounts of the reaction components in about 6 to 8 times their weight of alcohol until the mixture has become clear.

The reaction can be facilitated by adding some water, for instance by working with commercial 95% ethyl alcohol, and/or by imparting to the reaction mixture a very weakly acid reaction, as for instance by adding a small amount of a salt of a weak base and a strong acid, like ammonium chloride, or of acetic acid; also hydrogen may be passed through the reaction mixture after adding a mild hydrogenation catalyst like pure, superficially activated nickel or alloys thereof with copper as is well known in the art.

After about one-half of the alcohol has been distilled off, and the solution has been kept standing at room temperature for some time, practically white, generally microcrystalline, substances are precipitated which are then removed by conventional methods. If too much water has been present, the precipitate may have a ropy nature and is difficultly dried. In this case, it is best to warm the mixture until dissolution occurs and to remove some water with the aid of anhydrous sodium sulphate, or the like, filter the whole and let the liquid cool for precipitation.

According to analysis the reaction products are apparently polyhydroxyalkyl amino sulfonamides and when using sulfanilamide itself correspond to the general formula R—NH—R$_1$—SO$_2$—NH$_2$ in which R corresponds to the aldose used and NH—R$_1$—SO$_2$—NH$_2$ defines the radical of the original sulfonamide. The products are, therefore, apparently of the nature of osamines containing cyclic ether linkages. In contradistinction to the Schiff's base, say from glucose and sulfanilamide, which is practically insoluble in water, these compounds are very easily soluble in water, physiological i. e. 4% aqueous common salt solutions, and other aqueous liquids like solutions of enxymes, ferments or proteins and also in sera. The products may be used in the crude state, even if they should still contain traces of the original aldose, or after purification; their toxicity, tested by injection of solutions to mice, guinea pigs and rabbits is lower than that of corresponding amounts of sulfanilamide even when the latter is administered orally. Intramuscular and intravenous injections of the above mentioned solutions are not painful to human beings and better tolerated than sulfanilamide even when administered orally.

The following examples will further illustrate the nature of our invention which, however, is not restricted to these specific examples.

Example 1

11.5 grams of commercial galactose (M. P. 168° C.) and 11 grams of commercial sulfanilic acid amide (M. P. 164° C.) and containing traces of sulfanilic acid are added to 165 ccs. of pure 95% ethyl alcohol and the mixture is refluxed for from 5½ to 6 hours, the liquid being almost clear after 4 hours heating. The reaction may be shortened by about one half hour by adding at the start about 100 mgs. of ammonium chloride. Any traces of galactose left are then filtered off from the hot solution from which 100 ccs. are then distilled off. After standing for some time at room temperature, a white precipitate appears which slowly increases and converts the mixture into a soft white pulp. The alcohol is then filtered off by suction and the white mass of colorless, minute feathery crystals is washed with alcohol and with acetone for the removal of any sulfanilamide. The crude material obtained in a yield of 78% of the theoretical yield shows, after drying in vacuo over calcium chloride, a melting point of 142–144° C. which rises by recrystallization from 95% ethyl alcohol. It is rapidly soluble in water at room temperature but very slightly soluble in ethyl ether and acetone. By acetylation in pyridine, 4 acetyl groups may be introduced which indicates that an ether linkage is still present though a rearrangement may have taken place.

The dry product may be sterilized by heating to about 85° C. For the preparation of solutions suitable for injection 50, 100 or even 250 mgs. may be dissolved in each cubic centimeter of water or in physiological salt solution. In severe cases in which bacteria have already shed large amounts of toxin into the body it is strongly recommended to administer at the same time a non-specific, or even better, a specific serum, such as the antitoxic horse sera against streptococci; in view of the particularly high solubility of the above described product it is, however, possible to dispense with a separate administration of a serum and to dissolve the product in the serum chosen, in the same way as in water or salt solution.

In view of the quick absorption rectal application is possible as is oral use in the dry form or dissolved in any more or less-neutral aqueous liquid.

If 6 grams each of lactose and of sulfanilic acid amide are refluxed in 150 ccs. of 95% ethyl alcohol for about 5 hours and about 90 ccs. of the alcohol are then distilled off, white leaflets precipitate as the solution cools on standing. The properties of this product are similar to those of that described above.

Example 2

10 grams of xylose and 11.4 grams of sulfanilic acid amide are added to 130 ccs. of pure 95% ethyl alcohol and the whole is refluxed for 3 hours, the mixture becoming clear after about 40 minutes. 80 ccs. of the alcohol are then distilled off. After standing for about 10 hours the microcrystalline precipitate is filtered off by suction and washed with alcohol and a little acetone. After drying in vacuo a white product having a melting point of about 150° C. is obtained in a yield of 73% of the theoretical yield. It is even more easily soluble in water than the product obtained from galactose.

What we claim is:

1. The process which comprises heating an amino aromatic sulfonamide and an aldose with abnormal ether linkage in a lower aliphatic alcohol at least until most of said amide and said aldose are dissolved, removing any solid residue, evaporating at least one half of the alcohol and recovering solid products formed after cooling.

2. The process which comprises heating about equimolecular quantities of sulfanilic acid amide and of galactose in about 7 times their weight of about 95% ethyl alcohol until most of said amide and said aldose are dissolved, removing any solid residue, evaporating at least one half of the alcohol and recovering solid products formed after cooling.

3. Water soluble polyhydroxy-alkyl amino aromatic sulonamides, the polyhydroxy-alkyl radical containing a cyclic ether linkage and corresponding to the residue of an aldose having an abnormal ether linkage.

4. Water soluble polyhydroxy-alkyl amino benzene p-sulfonic acid amides, the polyhydroxy-alkyl radical containing a cyclic ether linkage and corresponding to the residue of an aldose having an abnormal ether linkage.

5. Water soluble polyhydroxy-alkyl aromatic amino sulfonamides containing a cyclic ether linkage in the polyhydroxy-alkyl radical, the said radical containing from five to twelve carbon atoms and corresponding to the residue of an aldose having an abnormal ether linkage.

6. Water soluble polyhydroxy-alkyl amino benzene p-sulfonic acid amides containing a cyclic ether linkage in the polyhydroxy-alkyl radical, the said radical containing from five to twelve carbon atoms and corresponding to the residue of an aldose having an abnormal ether linkage.

7. Galactosamino aromatic sulfonamides.

8. Xylosamino aromatic sulfonamides.

9. Lactosamino aromatic sulfonamides.

10. An injectable solution containing serum and a polyhydroxy-alkyl aromatic amino sulfonamide, the polyhydroxy-alkyl radical containing a cyclic ether linkage and corresponding to the residue of an aldose having an abnormal ether linkage.

11. An injectable solution containing serum and galactosamino aromatic sulfonamide.

12. An injectable solution containing serum and xylosamino aromatic sulfonamide.

13. An injectable solution containing serum and lactosamino aromatic sulfonamide.

14. The reaction product of an aromatic amino sulfonamide with an aldose having an abnormal ether linkage.

15. The reaction product of amino benzene p-sulfonamide with an aldose having an abnormal ether linkage.

16. The reaction product of an aromatic amino sulfonamide with galactose.

17. The reaction product of an aromatic amino sulfonamide with xylose.

18. The reaction product of an aromatic amino sulfonamide with lactose.

FRITZ MEYER.
EVA SCHREIBER, NÉE STEGE.